(No Model.)
G. W. WYSOR.
KITCHEN CABINET.
No. 539,109. Patented May 14, 1895.
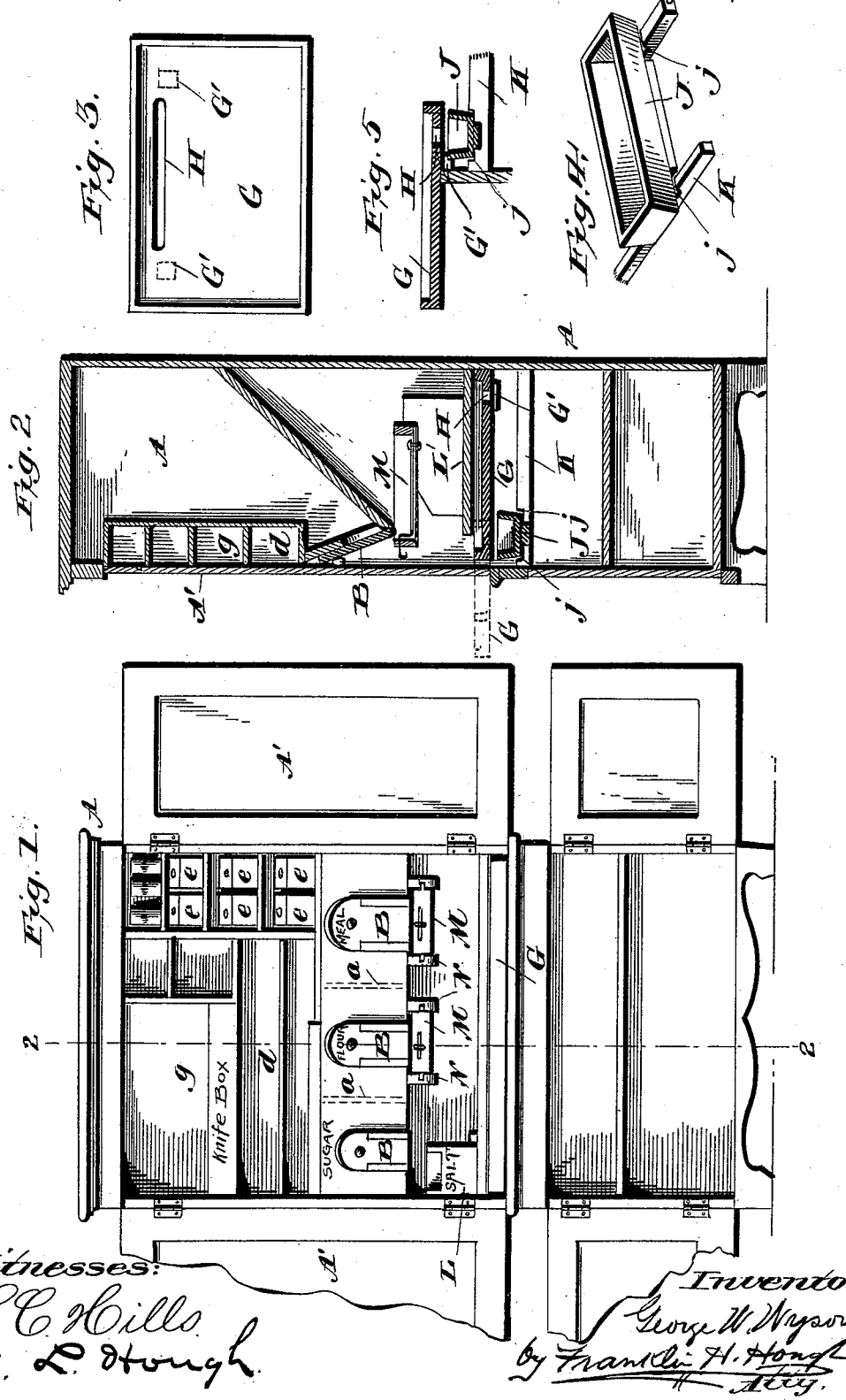

UNITED STATES PATENT OFFICE.

GEORGE W. WYSOR, OF HUNTINGTON, WEST VIRGINIA, ASSIGNOR OF ONE-HALF TO ROBERT L. DAY, OF SAME PLACE.

KITCHEN-CABINET.

SPECIFICATION forming part of Letters Patent No. 539,109, dated May 14, 1895.

Application filed March 7, 1895. Serial No. 540,893. (No model.)

*To all whom it may concern:*

Be it known that I, GEORGE W. WYSOR, a citizen of the United States, residing at Huntington, in the county of Cabell and State of West Virginia, have invented certain new and useful Improvements in Kitchen-Cabinets; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in kitchen cabinets, and the aim of the invention is to produce a compact cabinet having compartments for the reception of various ingredients, as flour, spices, and receptacles for culinary articles, the flour bins having slides through which the flour may be fed to the kneading board beneath, and a sieve slidingly attached to the cabinet, which sieve may be pushed back out of the way when not in use.

A further object of the invention resides in the peculiar construction of a cabinet of this character, in which a removable kneading board is so constructed with a longitudinal slot along its rear edge through which any waste flour may pass to be caught by a tray located beneath the same.

To these ends and to such others as the invention may pertain, the same consists further in the novel construction, combination and adaptation of the parts as will be hereinafter more fully described and then specifically defined in the appended claims.

I clearly illustrate my invention in the accompanying drawings, which with the letters of reference marked thereon form a part of this specification, and in which, similar letters of reference indicate like parts throughout the several views, in which—

Figure 1 is a front elevation of my cabinet with the doors removed or open. Fig. 2 is a vertical section on the line 2 2 of Fig. 1. Fig. 3 is a detail view of the kneading-board. Fig. 4 is a perspective view of the tray, and Fig. 5 is an enlarged detail in perspective hereinafter referred to.

Reference now being had to the details of the drawings by letter, A designates the inclosing frame having doors A', and a, a, represent partitions dividing the portion behind the set of shelves into bins for the reception of flour, sugar, &c., and B, B, designate slides covering the outlets to the bins; c, c, a series of small shelves for the reception of spices; e, e, and d and g, receptacles for holding spoons, knives and various culinary articles; L, a salt receptacle. Behind the shelves above mentioned, the space is divided into three bins, and directly beneath the flour slides to the bins is located my improved kneading board, made either of wood, wood lined with porcelain or made of any suitable material. The said board G has a cleat G', secured to its under surface which abuts against the front facing of the cabinet, when the kneading board is drawn out, thus serving to check the board and prevent its being entirely withdrawn from the cabinet.

H is a longitudinal slot in the kneading board near its rear edge through which slot the waste flour is adapted to fall to be caught by the tray J which is mounted in a recess j in the cross-piece K. When it is desired to withdraw the kneading board, the forward end is slightly raised and the same may be readily taken out, after which the tray may be removed to empty its contents. When the board is not in use it is pushed back under the dresser L'.

Located beneath the flour bin is the sieve M having cleats on its two opposite edges which work in the slots in the members N fastened to the bottom of the bin, whereby when the sieve is not in use it may be pushed back out of the way, the stirrer of the sieve being composed of the angular shaped wires resting on the wire mesh and having a handle passing through a perforation in the front face of the sieve.

Having thus described my invention, what I claim to be new, and desire to secure by Letters Patent, is—

1. In a kitchen cabinet, the combination of the shelves, and bins having slide covered outlets as described, a sieve having side cleats and designed to work in recesses in members on either side of the flour outlet, the sliding molding board having an elongated slot through which waste flour is adapted to pass, and a removable receptacle for receiving such waste, substantially as shown and described.

2. In combination with a kitchen cabinet as described the kneading board G, having an elongated slot, H, the tray J, seated in a recess $j$ in the cleat K, substantially as and for the purpose set forth.

In testimony whereof I affix my signature in presence of two witnesses.

GEORGE W. WYSOR.

Witnesses:
 ROBT. L. HUTCHINSON,
 C. R. WYATT.